United States Patent [19]
Beakes

[11] Patent Number: 5,946,792
[45] Date of Patent: Sep. 7, 1999

[54] STATOR MANUFACTURING METHOD AND APPARATUS

[75] Inventor: John M. Beakes, Fairborn, Ohio

[73] Assignee: Globe Products Inc., Huber Heights, Ohio

[21] Appl. No.: 09/028,437

[22] Filed: Feb. 24, 1998

Related U.S. Application Data

[60] Provisional application No. 60/039,451, Feb. 24, 1997.

[51] Int. Cl.$^6$ .................................................. H02K 15/09
[52] U.S. Cl. ........................... 29/596; 29/564.6; 29/736; 242/432.4
[58] Field of Search .................................. 29/596, 564.1, 29/564.6, 564.8, 736; 242/432.2, 432.3, 432.4, 432.5, 432.6

[56] References Cited

U.S. PATENT DOCUMENTS

| | | |
|---|---|---|
| 3,747,187 | 7/1973 | Colwell . |
| 4,000,764 | 1/1977 | Reiger, Jr. . |
| 4,074,418 | 2/1978 | Pearsall . |
| 4,951,379 | 8/1990 | Clemenz . |
| 4,969,606 | 11/1990 | Santandrea et al. . |
| 4,997,138 | 3/1991 | Luciani et al. . |
| 5,090,107 | 2/1992 | Beakes et al. . |
| 5,090,108 | 2/1992 | Banner et al. . |
| 5,214,838 | 6/1993 | Beakes et al. . |
| 5,341,997 | 8/1994 | Luciani . |
| 5,495,659 | 3/1996 | Beakes et al. . |
| 5,535,503 | 7/1996 | Newman . |
| 5,685,061 | 11/1997 | Beakes . |
| 5,755,021 | 5/1998 | Beakes . |

FOREIGN PATENT DOCUMENTS

WO 96/34446  10/1996  WIPO .

OTHER PUBLICATIONS

Drawings prepared for the purpose of this Information Disclosure Statement showing the prior art (pre 1990) winding guide tooling member and discussed in the Information Disclosure Statement.

*Primary Examiner*—Carl E. Hall
*Attorney, Agent, or Firm*—Roger S. Dybvig

[57] ABSTRACT

Stator coils are wound on a stator winding station and at least some of the coil leads are aligned, at the winding station, with terminal members on the distal end of the stator (opposite the winding head). The leads are held in temporary wire clamps adjacent the proximal end of the stator (closest to the winding head), and the stator and the wire clamps are transferred together to a lead terminating station where tooling is provided to terminate coil leads to the terminal members on the distal end of the stator without reorientation of the stator's longitudinal axis. Terminations are also made to the proximal end of the stator. The coil lead termination tooling serves both to connect the coil leads to the terminal member on the distal end of the stator and to sever the leads closely adjacent their respective terminal members.

8 Claims, 6 Drawing Sheets

STATOR MANUFACTURING METHOD AND APPARATUS

CROSS-REFERENCE TO RELATED APPLICATION

This application claims the benefit of copending U.S. Provisional Application No. 60/039,451, filed Feb. 24, 1997.

FIELD OF THE INVENTION

This invention relates to a stator manufacturing method and apparatus and, although not necessarily so limited, is especially adapted for the manufacture of 2-pole stators for electric motors or other electrical devices.

INCORPORATION BY REFERENCE

The disclosures of the following United States patents, patent applications, and other publications are hereby incorporated by reference herein:

Beakes, U.S. Pat. No. 5,685,061
Newman, U.S. Pat. No. 5,535,503
Beakes et al., U.S. Pat. No. 5,495,659
Beakes et al., U.S. Pat. No. 5,370,324
Beakes et al., U.S. Pat. No. 5,186,405
Banner et al., U.S. Pat. No. 5,090,108
Beakes et al., U.S. Pat. No. 5,090,107
Luciani et al., U.S. Pat. No. 4,997,138
Santandrea, U.S. Pat. No. 4,969,606
Clemenz, U.S. Pat. No. 4,951,379
PCT Publication No. WO 96/34446

BACKGROUND OF THE INVENTION

Modern stator manufacturing production lines include several different stations at which different manufacturing operations are performed. One such operation that is frequently accomplished at an early stage in the process for manufacturing a 2-pole stator is to assemble stator coil terminals or supports therefor on an unwound stator core. Thereafter, the stator coils are wound on the stator core pole pieces at a stator winding station using magnet wire having an electrically insulating coating. A common practice in use at this time is to temporarily clamp the stator coil lead wires to wire clamps during the winding process. At a later manufacturing stage, the lead wires are connected to the terminals mounted on the stator core at a coil lead terminating station.

One type of stator manufacturing machine, known as a turret winder, such as the machine 50 disclosed in above-mentioned Beakes et al. U.S. Pat. No. 5,186,405, includes a turret by which unwound stators having cores on which terminal members have previously been assembled are moved to a stator winding station at which the stator coils are wound and by which the freshly wound stators are then moved to a lead terminating station at which the stator coil lead wires are connected to the terminal members on the core. Lead pull assemblies at the winding station have wire grippers which are manipulated to place the stator coil lead wires into temporary wire clamps that are moved to the lead terminating station along with the wound stator. Mechanisms at the lead terminating station remove the stator coil lead wires and connect them to stator terminals or terminal support members on the stator core. As known to those familiar with the stator winding art, the same general method is practiced using different types of mechanisms for transporting the stator from the winding station to the coil lead terminating station, such as shown in the above-mentioned Banner et al., U.S. Pat. No. 5,090,108.

Most stators are made with the start and finish leads of the stator coils terminated on terminals located at only one axial end of the stator. The axial end of the stator that faces and is nearest the winding head at the winding station and that faces and is nearest the robot at the lead terminating station is referred to in this application, including the appended claims, as the proximal end of the stator. The end of the stator opposite its proximal end is referred to as the distal end of the stator. As explained in the above-mentioned Luciani et al. U.S. Pat. No. 4,997,138, occasions arise when motor manufacturers specify that some of the stator coil leads terminate on the proximal end of the stator and other leads terminate on the distal end of the stator. U.S. Pat. No. 4,997,138 describes a method and an apparatus for connecting coil leads to temporary wire clamps located on both ends of a stator, but the method and apparatus are quite complex, requiring separate sets of temporary wire clamps on both ends of the stator core and mechanisms on both ends of the stator core for aligning and inserting the lead wires into the temporary wire clamps.

FIGS. 6 and 7 of the above-mentioned Santandrea U.S. Pat. No. 4,969,606 show two different machine floor plans enabling coil leads held by temporary wire clamps located adjacent the opposite ends of a stator core to be terminated into terminals on the opposite ends of the core. Two terminating stations are required, with two sets of terminating mechanisms. The stator is held with its longitudinal axis extending horizontally at a first terminating station at which coil lead terminations are made on the proximal end of the stator. The stator is rotated at the second terminating station so that the longitudinal axis of the stator extends vertically and the distal end of the stator is presented at the second terminating station to enable the coil lead terminations to be made on the distal end of the stator.

SUMMARY OF THE INVENTION

An object of this invention is to provide an inexpensive, simple and reliable method and apparatus for terminating stator coil leads to terminal members located on the end of a stator core opposite the end to which leads are usually terminated.

Another object of this invention is to provide a relatively inexpensive, simple and reliable method and apparatus for connecting stator coil leads to terminals on opposite ends of a stator core.

This invention is primarily intended for use with a turret stator winder, such as shown in the above-mentioned Beakes et al. U.S. Pat. No. 5,186,405 or the above mentioned Santandrea U.S. Pat. No. 4,969,606. However, it will be evident that this invention could also be used with other stator winding machines, such as the machine shown in the above-mentioned Banner et al. U.S. Pat. No. 5,090,108.

In accordance with this invention, the coil start leads are inserted at the winding station into temporary wire clamps adjacent the proximal end of the stator core utilizing the lead pulls disclosed in the aforementioned Beakes et al. U.S. Pat. Nos. 5,370,324 and 5,186,405. These start leads are subsequently terminated on terminal members on the same, proximal end of the stator core using conventional techniques, preferably by means of an industrial robot and associated tooling, if needed, such as shown in the above mentioned U.S. Pat. Nos. 5,090,107 or 5,535,503.

Here it should be noted that the terminology "terminal member" refers either to a terminal to which a lead wire is terminated or to a support for a terminal member to which a lead wire is terminated and in which a terminal is inserted during a subsequent operation. Also, the termination of a lead wire to a terminal member by the robot will not usually be the final connection, such being accomplished during a subsequent manufacturing process referred to as fusing or hot staking.

Further in accordance with this invention, the finish leads of a coil are aligned with terminal members on the distal end of the stator while the stator is still located at the winding station. Such alignment is accomplished by cooperative movements of the stator winding needles and wire guide tooling which guides the finish wires into alignment with the terminals on the distal end of the stator. The stretch of wire between a terminal on the distal end of the stator tooling and an associated wire winding needle is extended from the distal end of the stator around a wire-locating abutment on the stator and then through the bore of the stator. The latter stretch of wire is then inserted into a temporary wire clamp located adjacent the proximal end of the stator core utilizing the same lead pull mechanism shown in the Beakes et al. U.S. Pat. Nos. 5,370,324 and 5,186,405. The wire-locating abutment on the stator is so located that the desired alignment between a finish wire and a terminal member on the distal end of the stator is maintained when the stretch of wire extending from the finish lead is held by a temporary wire clamp. The wire-locating abutment can be formed on the terminal board mounted on the second end of the stator core and may be part of the terminal member or the terminal member support.

At the lead terminating station, the coil start leads are terminated to terminal members located on the proximal end of the stator by use of an industrial robot and, if necessary, tooling such as that shown in aforementioned U.S. Pat. Nos. 5,090,107 or 5,535,503. The finish leads are terminated and severed closely adjacent the terminal members on the distal end of the stator by a termination tooling assembly which includes at least one wire cutter assembly for cutting the finish lead adjacent its terminal member. The stretch of wire extending from the finish wire terminal to the temporary wire clamp can be removed by a robot after the stretch is cut free from the terminated finish wire. To this end, the latter stretch of wire is preferably gripped by the robot end effector before operation of the termination tooling assembly. In operation, the termination tooling assembly is advanced toward the distal end of the stator, effects the termination of the finish wire to its terminal member on the distal end of the stator, and then severs the finish wire adjacent its terminal member.

The foregoing and other objects and advantages of this invention will become apparent from the following description and the accompanying drawings.

DETAILED DESCRIPTION

Figures 1, 10:
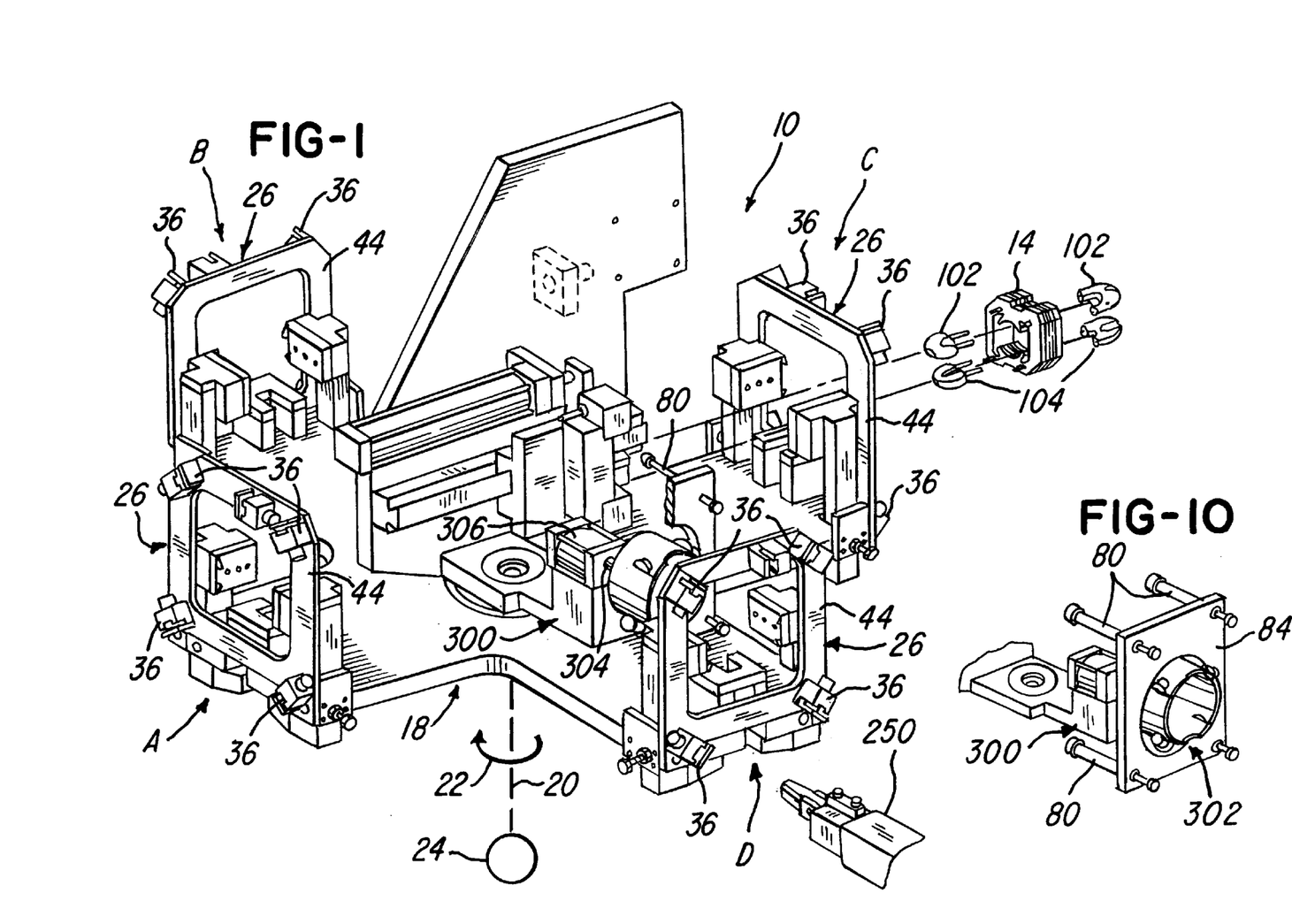
FIG. 1 is a highly simplified, partially diagrammatic, partially exploded, fragmentary perspective view of portions of a stator manufacturing machine embodying the instant invention and including a perspective view of a stator to be wound.
FIG. 10 is a fragmentary, perspective view of a finish wire termination tooling assembly in accordance with this invention for effecting connections of stator coil finish wires to terminal members on the distal end of a stator and for severing the finish wires adjacent the terminal members.
Figure 2:
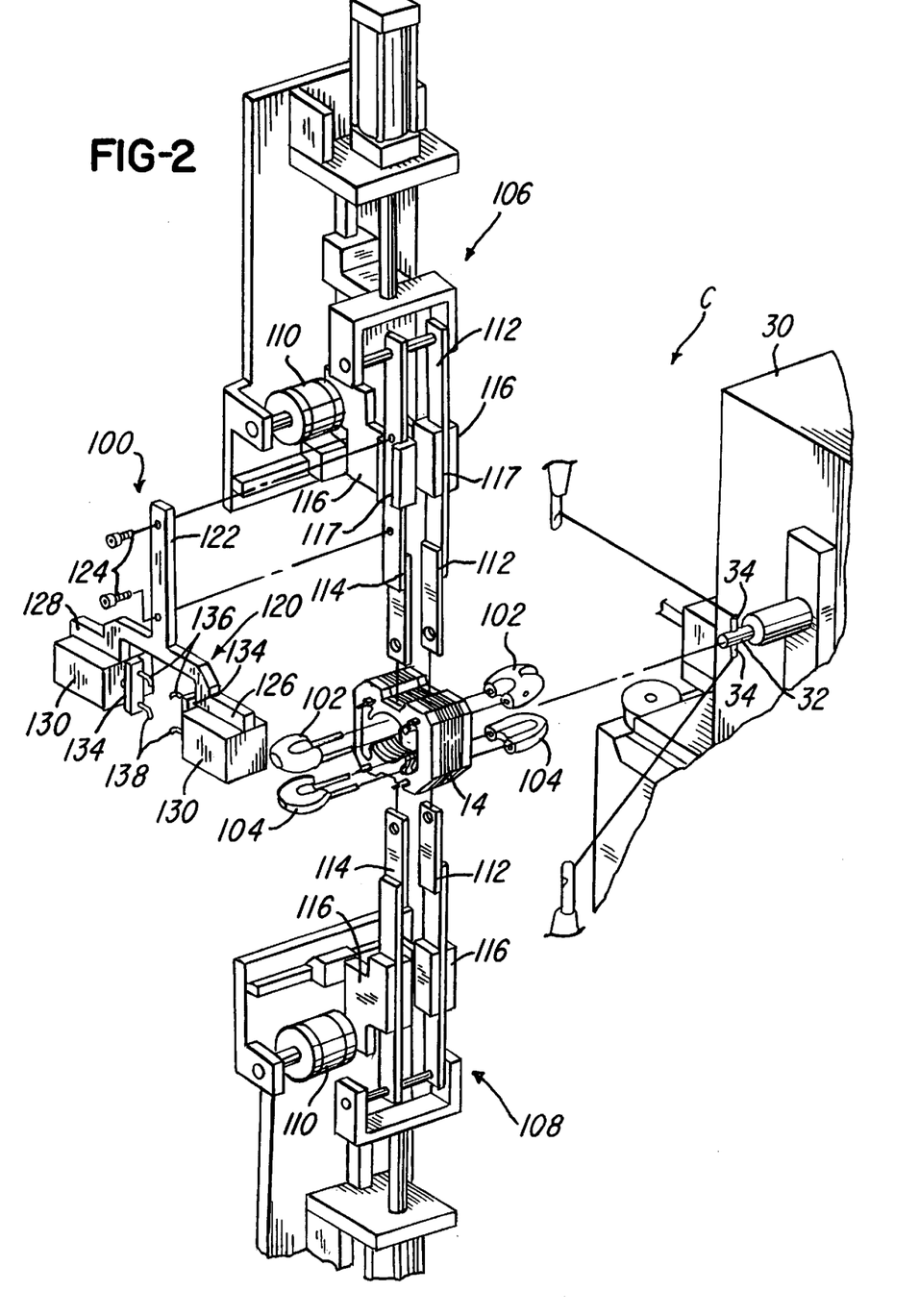
FIG. 2 is a highly simplified, enlarged, partially diagrammatic, partially exploded, fragmentary perspective view of other portions of the machine shown in FIG. 1 and including a perspective view of the stator to be wound.

With reference to FIGS. 1 and 2, this invention is incorporated into a stator manufacturing apparatus, generally designated 10, and is used to wind coils 12 (FIG. 3) formed from insulated magnet wire onto a 2-pole stator 14 and to connect the coil lead wires to stator terminal members 16 mounted on the stator core. All of the operations of the apparatus 10 are synchronized and controlled by suitable machine controls, which are known, may be conventional, and are not further described herein.

Apparatus 10 includes a turret plate 18 mounted for rotation about a vertical axis 20 and can be repeatedly rotationally indexed through successive 90 degree increments in one direction, as indicated by the arrow 22 in FIG. 1, about its vertical axis 20 by a suitable indexing drive motor 24. Stators to be wound are clamped to an individual one of four stator support and clamp mechanisms, generally designated 26, to which they remain clamped throughout a complete cycle winding and lead terminating operations.

The four stator clamp mechanisms 26 are connected to the turret plate 18 at 90 degree spaced locations so that, in operation, after each 90 degree index of the turret plate 18, there will be a clamp mechanism 26 at each of four stations, namely a load/unload station A, an idle station B, a winding station C, and a coil lead terminating station D. At each of the stations, the stators are positioned with their center axes extending horizontally and substantially perpendicularly with respect to the vertical axis 20 of the turret plate 18 and with the proximal end faces of the stators in vertical orientations and spaced a fixed horizontal distance from the vertical axis 20 of the turret plate 18.

At the load/unload station A, a newly wound stator 14 is unclamped from its support and clamp assembly 26, removed from the turret plate 18, and replaced by an unwound stator 14. No operations are performed on the stator at the idle station B. With reference also to FIG. 2, at the winding station C, a pair of stator coils are wound by the operation of a winding head 30 located adjacent the winding station C that has a reciprocating and oscillating shuttle or ram 32 that draws wires from sources (not shown) of wire under tension and having wire guide needles 34 through which the wires exit as the coils are wound. The winding shuttle or ram 32 reciprocates and oscillates about a fixed horizontal axis in order to wind coils of wire around the stator pole pieces in a manner well known in the art.

At each turret station, temporary wire clamps 36 are mounted on a clamp mounting plate 44, which may be made from aluminum or other suitable material and which is affixed to the turret plate 18. As shown in FIGS. 1 and 10, there are four clamp release actuators 80, one for each temporary clamp 36, mounted on a vertical support plate 84 that is fixed and does not rotate with the turret plate 18. Therefore, the clamp release actuators 80 remain adjacent the lead wire termination station D at all times. Here it may be noted that there are occasions when more than four temporary clamps 36 may be used, particularly for stators having coils with intermediate taps. As evident, there would then be more than four clamp release actuators 80.

FIG. 2 illustrates the stator 14 to be wound along with upper and lower pairs of winding forms 102 and 104, respectively. In addition, upper and lower winding form retainer mechanisms, generally designated 106 and 108, respectively, are also illustrated. Winding form retainer mechanisms are known in the art, and the winding form retainer mechanisms 106 and 108 may be substantially identical to the form retainer mechanisms illustrated in the Beakes et al. U.S. Pat. No. 5,370,324, except for certain modifications to the upper form retainer mechanism 106 which will be described below. It will be noted that the form retainer mechanisms described in the '324 patent are operated, in part, by programmablly controllable drive motors 110, but it will be understood that the form retainer mechanism may alternatively be operated manually, as by a hand crank (not shown) in place of the programmablly controllable drive motors.

Briefly, the winding form retainer mechanism 106 comprises a mutually-spaced pair of form retainer blades 112 and 114 which can be driven toward and away from one another by the aforementioned motors 110 (or by hand) to adjust to various stator stack heights. Each of the form retainer blades 112 and 114 is kept in proper vertical alignment with the stator 14 located at the winding station C by a carriage 116 having a vertically-extending guide slot 117 which confines the respective form retainer blade 112 or 114. The carriage 116 which confines the form retainer blade 112 adjacent the proximal end of the stator 14 may be identical to the carriage shown in the Beakes et al. U.S. Pat. No. 5,370,324. For reasons which will be described, the carriage 116 which confines the form retainer blade 114 has a vertically-extending blade-receiving slot 117 that is open in a direction facing away from the winding head 30.

Figure 3:
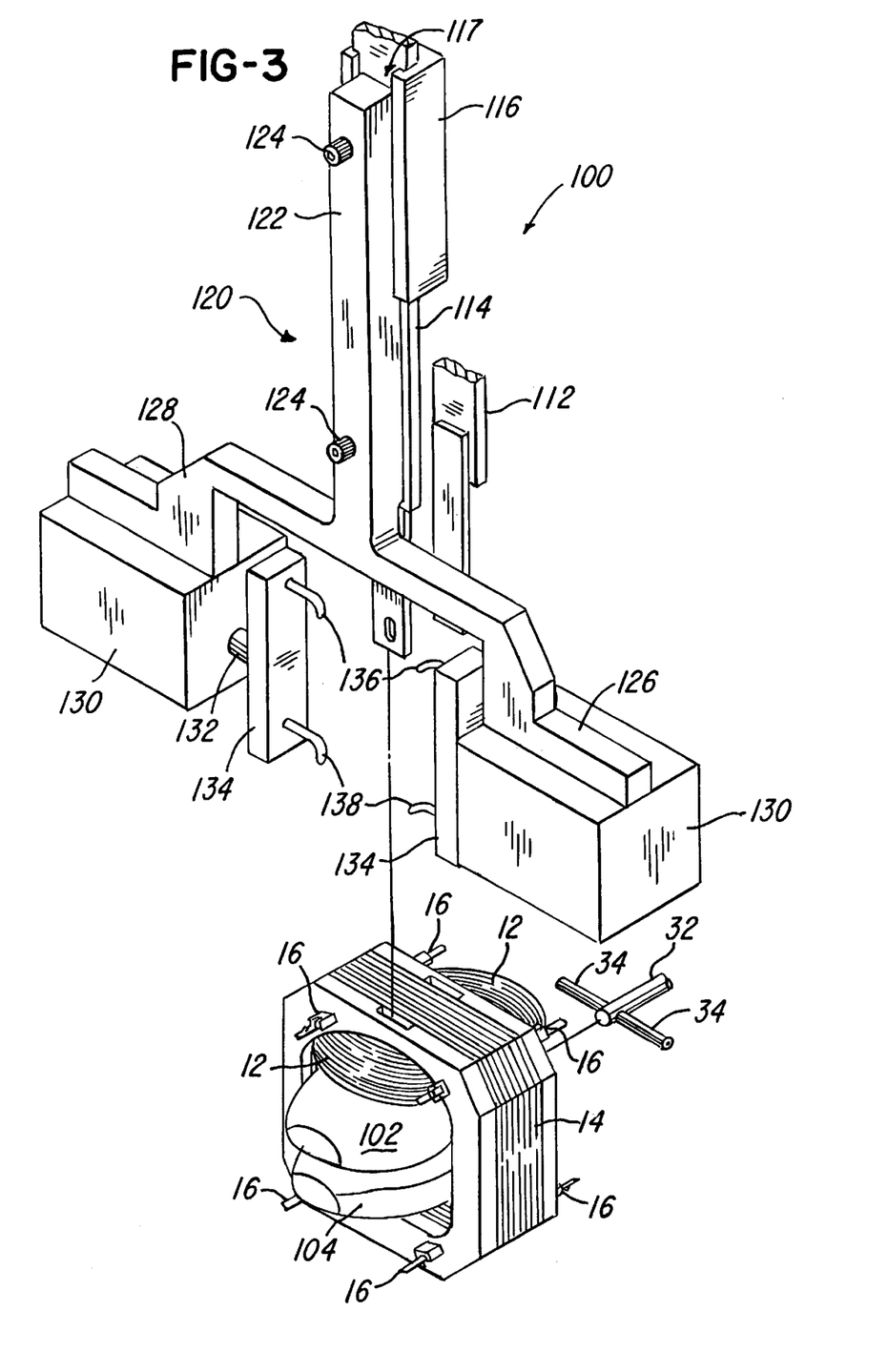
FIG. 3 is a yet further enlarged, fragmentary perspective view of wire guide tooling in accordance with this invention used to align stator coil finish wires with terminals projecting from the distal end of the stator, and diagrammatically illustrating a winding needle assembly and winding forms shown mounted on a stator to be wound.

With reference to FIGS. 2 through 6, the apparatus 10 is provided with a wire guide tooling assembly, generally designated 100, located at the winding station C. As explained above, the wire guide tooling assembly 100 is used to align coil finish leads with terminal members 16 on the distal end of stator cores. Referring particularly to FIGS. 2 and 3, the wire guide tooling assembly 100 is mounted to and carried by the upper form retainer blade 114 located adjacent the distal end of the stator 14. The wire guide tooling assembly 100 includes a frame member 120 generally in the shape of an inverted "Y".The frame member 120 has an upper support arm 122, which is secured to the form retainer blade 114 by screws 124, and a pair of mutually-opposed, laterally-projecting bracket arms 126 and 128. As now apparent, the foregoing modifications to the carriage 116 carrying the form retainer blade 114 are provided to permit the frame member 120 to be mounted to the form retainer blade 114. By mounting the frame member 120 in such a manner, the frame member 120 moves with the form retainer blade 114 so that it is properly oriented relative to the stator 14 when the form retainer mechanism 106 is adjusted for use with a given stator core stack height.

As best seen in FIG. 3, each of the bracket arms 126 and 128 of the frame member 120 carries a conventional, commercially-available air actuator, generally designated 130. It will be understood that the arm 126 and the components supported thereby are entirely the same as the arm 128 and the components supported thereby. Thus, further description of the wire guide tooling assembly 100 is limited to the bracket arm 126 and the components it carries, it being understood that the bracket arm 128 and the components it carries are mirror images. The air actuator 130 carried on the bracket arm 126 has a piston rod 132 to which is attached a support block 134, and two wire guide fingers that project from the support block, namely an upper wire guide finger 136 and a lower wire guide finger 138. As will be described below, the air actuator 130 is operated to advance one or the other of the wire guide fingers 136, 138 into confronting relationship with a terminal member 16 on the distal end of the stator so that a finish wire can be properly aligned with the terminal member 16.

Figure 4:
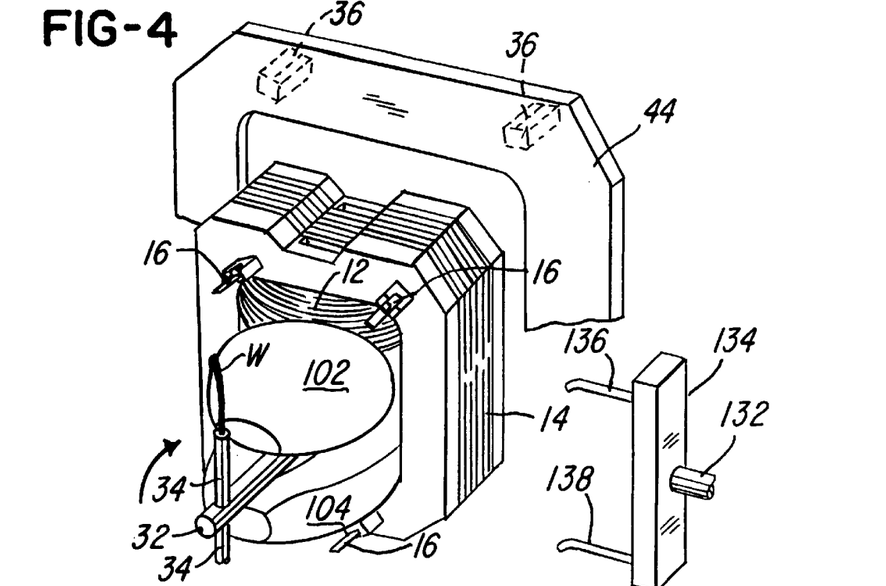
FIGS. 4 through 6 are simplified, fragmentary perspective views of parts of a stator manufacturing machine in accordance with this invention and a stator showing, in sequence, the alignment of a stator coil finish lead wire with a terminal member on the distal end of the stator at the winding station of the stator manufacturing machine.
Figure 5:
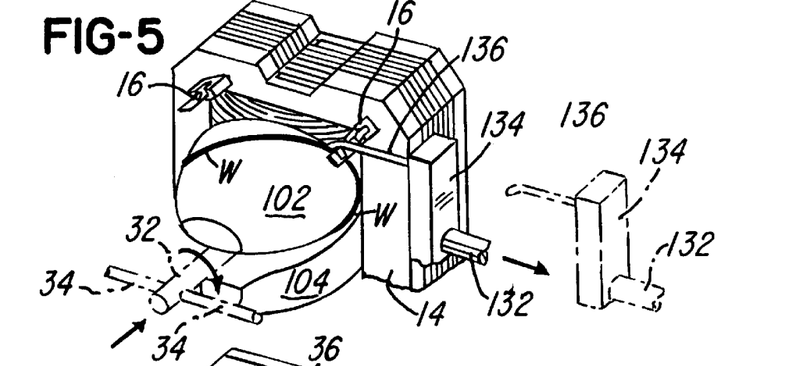
Figure 6:
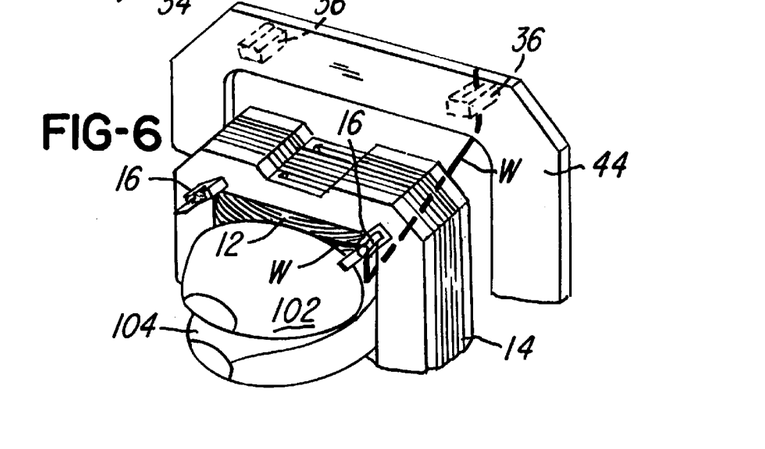

With reference now to FIGS. 4 through 6, the alignment of a stator coil finish wire with a terminal member 16 on the distal end of the stator core 14 is illustrated. The terminal member 16 to which the finish wire W is to be connected is the upper, rightmost terminal member 16 shown in FIGS. 4 through 6. FIG. 4 illustrates the stator 14 during the completion of the upper coil 12 with the winding ram 32 and needles 34 located adjacent the distal end of the stator 14. Movements of the ram 32 are interrupted, either with the needles 34 rotated to the vertically-opposed position shown in FIG. 4 or before oscillation of the ram 32. It will be noted that the wire guide tooling assembly 100 has not yet been actuated to advance the upper wire guide finger 136 into a confronting relationship with the terminal member 16. Before the ram 32 oscillates or continues its oscillatory movement, the air actuator 130 is operated to advance the support 134 and the wire guide fingers 136, 138 toward the stator 14 until the upper finger 136 extends over the terminal member 16 as shown in FIG. 5. The finger 136 extends generally horizontally over the terminal member 16 with its free end following a path downwardly and away from the stator 14 to a point of engagement with the winding form 102. Here, it may be noted that the particular shape of the finger 136 will vary depending on the configuration and location of the terminal member 16.

Figure 11:
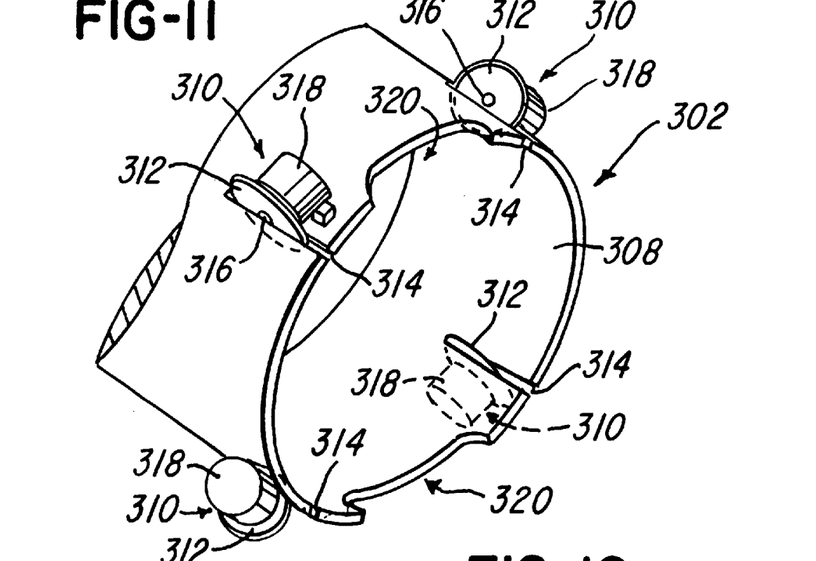
FIG. 11 is an enlarged, fragmentary perspective view of the front end portion of the finish wire termination tooling assembly shown in FIG. 10.

Oscillation of the winding ram 32 is resumed and it is then drawn back through the bore of the stator 14, thus causing the stretch of wire extending from the needle 34 to be pulled upwardly along the surface of the winding form 102, such stretch of wire forming a finish wire W of the upper coil 12. The finish wire W engages the guide finger 136 as the ram 32 continues to be drawn back through the bore of the stator 14, which finger 136 prevents the stretch of wire forming the finish wire W from merely becoming part of the end turn of the stator coil 12. Instead, the finish wire W is cammed over and along the finger 136 and over the terminal member 16 to a position between the tang of the terminal member 16 and the distal end of the stator 14. Further withdrawal of the ram 32 causes the finish wire W to become engaged against a surface on the support 16A (FIG. 9) for the terminal member 16, which serves as an abutment to maintain the position of the finish wire W relative to the tang 17 (FIG. 9) of the terminal member 16. As mentioned above, the abutment may be formed on the distal end of the stator 14 in any suitable manner. For example, the abutment may be a separate part formed on the distal end terminal board or it may be part of the terminal itself or the terminal member support 16A formed on the terminal board. The wire guide tooling 100 is then retracted away from the stator 14, as shown in FIG. 5, which causes the finish wire W to be located within the bight of the tang 17 of the terminal member 16, as shown in FIG. 11. With reference to FIG. 6, the stretch of wire forming finish wire W, after having been drawn completely back through the bore of the stator 14, is temporarily secured in a conventional manner to a temporary wire clamp 36 adjacent the proximal end of the stator 14.

It will be understood that similar operations are carried out with respect to the finish wire of the lower coil and a terminal member (not shown) diagonally opposite the upper, rightmost terminal member 16 described above using the leftmost wire guide finger 138, shown in FIG. 3, operated by the air actuator 130 carried by the bracket arm 128 of the frame member 120. Although only one wire guide finger is used with each coil, as described above, there may be instances where the other wire guide fingers are also used. For example, if the coils were wound in a reverse direction, the finish wires might be connected to upper, leftmost and lower, rightmost terminal members 16, which would require use of the left-hand upper wire guide finger 136 and the right-hand lower wire guide finger 138, as opposed to use of the left-hand lower wire guide finger 138 and the right-hand upper wire guide finger 136 described above. In addition, there may be instances where intermediate taps are provided, such as for brake coils, in which case coil lead wires from a single coil may be connected to terminal members 16 on each side of distal end of the stator 14, which would require both left-hand and right-hand wire guide fingers 136, 138. Alternatively, an intermediate tap and a finish wire could be connected, respectively, to closely adjacent terminal members 16 located on the distal end of the stator on the same side of the coil.

Figure 9:
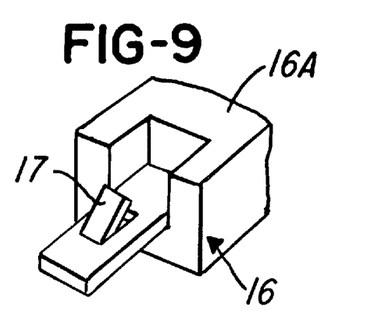
FIG. 9 is a fragmentary perspective view of a portion of a stator terminal and a terminal support of a type with which the present invention may be used.

One skilled in the art will recognize that the foregoing method and apparatus are best suited for use with terminal members 16 that do not project a great distance from the distal end of the stator 14 and that are located laterally closer to the vertical centerline of the stator 14 than the exit openings of the winding needles 34, when horizontally-opposed. However, it will be apparent to those skilled in the art that other terminal member configurations and locations may be used. For example, one skilled in the art will note that, although blade and tang-type terminal members 16 are illustrated in the accompanying drawings, as best shown in FIG. 9, this invention may also be used to terminate lead wires to AMP-type terminal support members (not shown) located on the distal end of the stator 14. It will be recognized that a separate abutment around which the lead wire is coursed in order to maintain the desired orientation relative to AMP-type terminal support members is not needed since the AMP-type terminal support member would itself have such a surface, e.g. the edge of a wall forming one of the slots in the terminal support member.

One skilled in the art will also recognize that, although this invention is illustrated and described with regard to a winding apparatus 10 utilizing winding forms 102 and 104 to accomplish coil winding, this invention may also be used with a so-called "formless" winding apparatus, such as the apparatuses described in U.S. Pat. Nos. 4,612,702 and 4,762,283, which do not require the use of winding forms, by moving the wire guide finger 136, 138 into the path of the wire exiting the winding needle 34.

Figure 7:
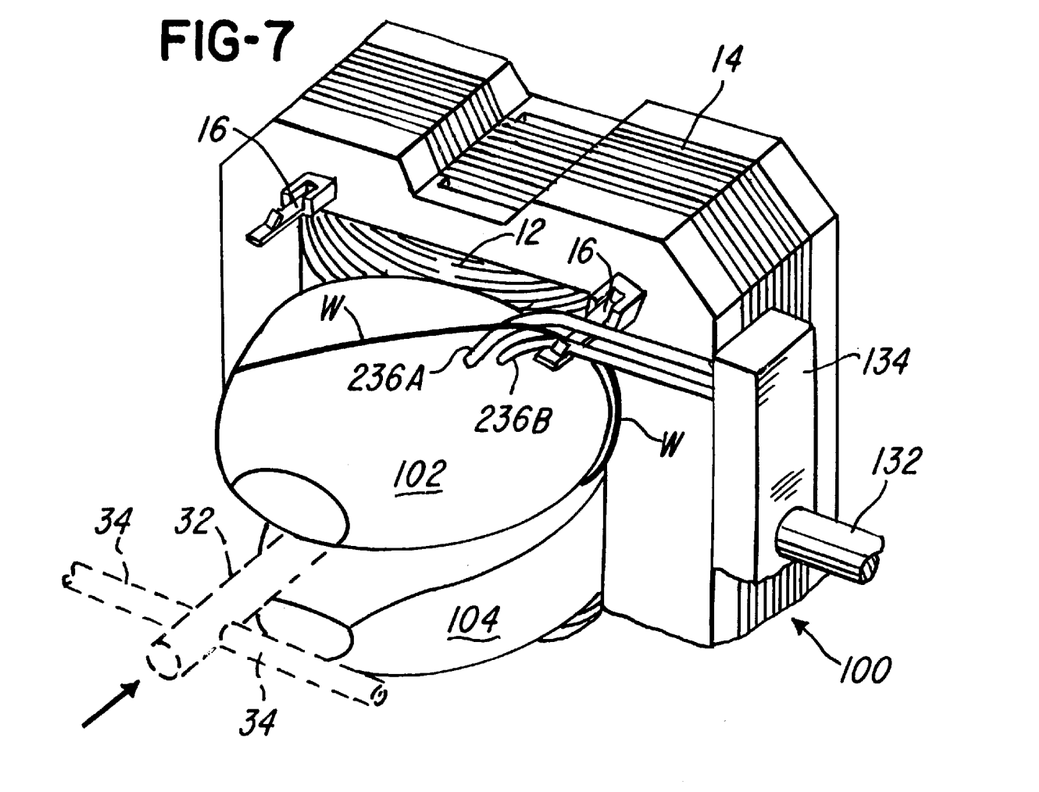
FIG. 7 is an enlarged, fragmentary, perspective view similar to FIG. 5, but showing a second embodiment of wire guide tooling in accordance with this invention.
Figure 8:
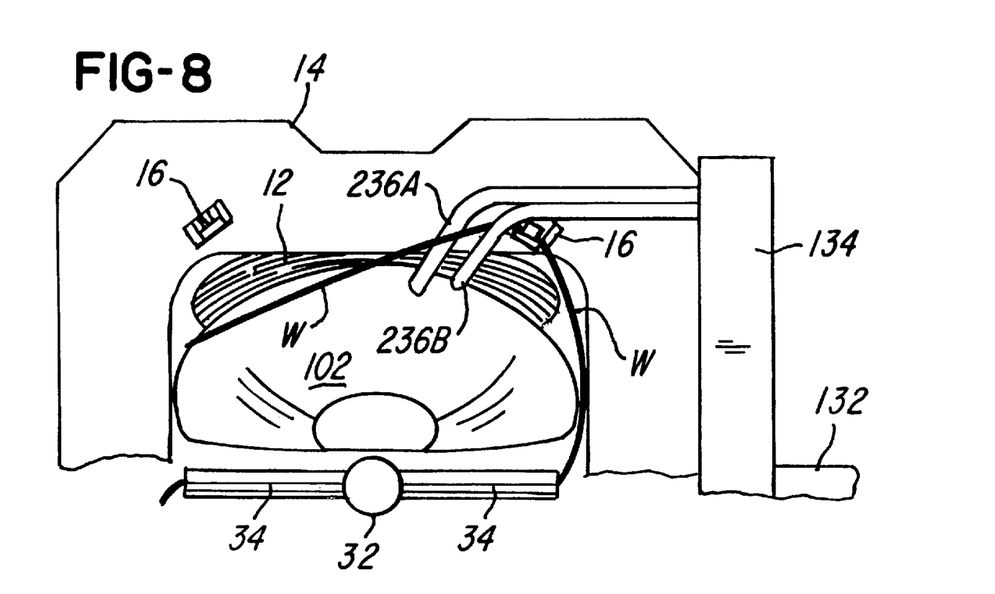
FIG. 8 is a fragmentary, end elevational view of the portion of a stator and wire guide tooling assembly shown in FIG. 7.

FIGS. 7 and 8 illustrate a second embodiment of a wire guide tooling assembly, generally designated 200, in accordance with this invention. The wire guide tooling assembly 200 is substantially identical to the wire guide tooling assembly 100, except that each wire guide finger 136, 138 of the wire guide tooling assembly 100 is replaced by a closely-spaced pair of parallel wire guide fingers 236A and 236B. Because the pairs of wire guide fingers are substantially identical to one another, only the upper wire guide fingers 236A and 236B are discussed further herein, it being understood the other pairs of fingers are constructed and operate in the same manner.

The wire guide fingers 236A and 236B are spaced apart by a sufficient distance to permit a finish wire W to enter the space between the fingers 236A, 236B. For example, a spacing on the order of 0.010" greater than the wire diameter is considered sufficient, but wider spacings on the order of twice the diameter of the wire may be needed. The wire guide finger 236A, which is closest to the stator 14, is identical to and functions in the same manner as the finger 136 described above with regard to FIGS. 2 through 6. Thus, the wire guide finger 236A engages the winding form 102 and causes the finish wire W to be properly aligned with the terminal member 16.

The wire guide finger 236B is slightly shorter in length than the finger 236A and located farther from the stator 14. In addition, it is contemplated that the wire guide finger 236B will be slightly lower than the wire guide finger 236A, as best shown in FIG. 8. The purpose of the second wire guide finger 236B is to ensure that the finish wire W is cammed along the first wire guide finger 236A. As the finish wire W is drawn toward the stator core along the surface of the winding form 102, the finish wire W engages the wire guide finger 236A as described above with regard to FIGS. 2 through 6. Because a small gap is provided between the free ends of the wire guide fingers 236A and 236B, the finish wire W, as it moves along the finger 236A, follows a path confined between the fingers 236A, 236B. As a result, the second wire guide finger 236B, in effect, ensures that the finish wire W cannot, for whatever reason, stray from the first wire guide finger 236A. Once the finish wire W is aligned with the terminal members 16, the finish wire W is then connected to a temporary wire clamp 36 adjacent the proximal end of the stator 14 as described above with regard to FIG. 6.

Following the alignment of the finish wires with their respective terminal members 16 and connection to temporary wire clamps 36, the stator 14 and the temporary wire clamps 36 are transferred to the coil lead terminating station D by rotation of the turret plate 18. At the lead terminating station D, the start wires, which were inserted in a conventional manner at the winding station B into temporary wire clamps 36 adjacent the proximal end of the stator 14, are gripped in seriatim by a conventional, industrial robot 250 (FIG. 1) and connected to their respective terminal members 16 in a well known, conventional manner utilizing the robot 250 and, if needed, suitable tooling, such as that described in the aforementioned U.S. Pat. Nos. 5,090,107 or 5,535, 503. Either before, after, or during the connection of the start wires to terminal members 16, the finish wires, which have already been aligned with terminal members 16 on the distal end of the stator 14, are temporarily secured to their respective terminal members 16 and severed closely adjacent thereto utilizing a termination tooling assembly located at the lead terminating station D.

With reference to FIGS. 1 and 10 through 13, the termination tooling assembly, generally designated 300, is located at the lead terminating station D. As with the clamp release actuators 80 and their support plate 84 described above, the termination tooling assembly 300 is fixed to the bed of the apparatus 10 and does not rotate with the turret plate 18. Accordingly, the termination tooling assembly remains at the lead terminating station D at all times. The termination tooling assembly 300 comprises a crimping and cutting assembly, generally designated 302, which is connected to the piston rod 304 of a non-rotating air cylinder 306. (Although not shown, one skilled in the art will recognize that guide rods may be employed on diametrically-opposed sides of the piston rod 304 to provide a more rigid structure.) The air cylinder 306 is operable to advance the crimping and cutting assembly 302 toward a stator 14 located at the lead terminating station D and, after the finish wires are terminated, to retract the crimping and cutting assembly 302 away from the stator 14.

The crimping and cutting assembly 302 is best shown in FIGS. 10 and 11 and comprises a generally cylindrical, hollow crimping member 308 on which are mounted four cutter assemblies, generally designated 310. Of course, one skilled in the art will recognize that more or fewer cutter assemblies 310 can be employed, as needed, and that the crimping member 308 can have other than a generally cylindrical shape. Each of the cutter assemblies 310 comprises a conventional, commercially-available steel cutting wheel 312 which is received in a longitudinally-extending, open-ended slot 314 in the crimping member 308. Cutting wheels 312 may be similar to those used in armature commutator cutting and are commercially-available from various suppliers, such as Joyal Products Inc., Linden, N.J. 07036. Each cutting wheel 312 is mounted to an axle 316, which may be a shoulder screw, rotatably received within an axle housing 318 secured to the outer surface of the crimping member 308. Consequently, the cutting wheel 312 is free to rotate within the slot 314 in which it is received. For reasons which will become apparent, each cutter assembly 310 is located on the crimping member 308 such that the cutting wheel 312 thereof will pass closely adjacent a terminal member 16 on the distal end of the stator 14 when the crimping and cutting assembly 302 is advanced toward the stator 14.

Figure 12:
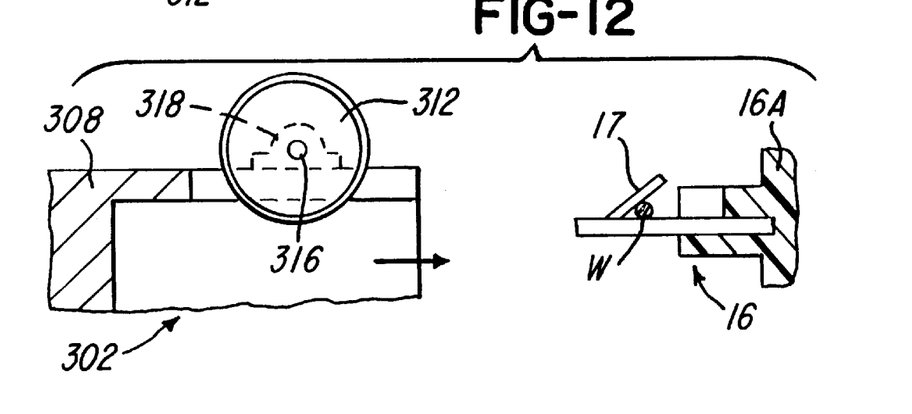
FIG. 12 is a fragmentary, cross-sectional view of the front end portion of the finish wire termination tooling assembly of FIG. 10 and the distal end of a stator with a terminal member supported thereby and illustrates the beginning of the operation of the termination tooling assembly when a finish wire is to be terminated on the illustrated terminal member.
Figure 13:
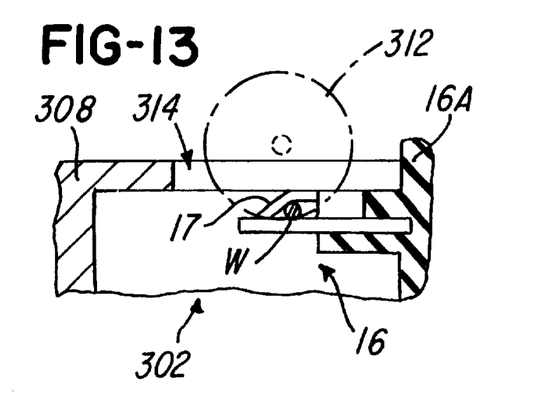
FIG. 13 is a fragmentary, cross-sectional view similar to FIG. 12, but showing the termination tooling assembly at a later stage in the operation thereof.

FIG. 12 illustrates the crimping and cutting assembly 302 before it is advanced into position adjacent the stator 14. As shown in FIG. 13, as the crimping and cutting assembly is advanced toward the stator 14, the leading edge of the crimping member 308 engages the tang of each terminal member 16 mounted on the distal end of the stator 14. Further advancement of the crimping and cutting assembly 302 causes each of the tangs to be folded or crimped, as shown in FIG. 13, thereby securing the finish wires W aligned therewith to their respective terminal members 16. As mentioned above, this connection is temporary in nature and a permanent connection of the finish wires to their respective terminal members 16 is accomplished at a later stage in the manufacturing process by a fusing or hot-staking operation. The crimping and cutting assembly 302 is advanced still further toward the stator 14 so that the cutting wheel 312 of each cutter assembly 310 passes closely adjacent a terminal member 16, thereby severing the lead wires W closely adjacent their respective terminal members 16. As best shown in FIG. 11, the crimping member 308 is provided with cut-out portions or notches 320 which receive the coil end turns when the crimping and cutting assembly 302 is advanced into position adjacent the stator 14.

One skilled in the art will note that, in some instances, the terminal members on the distal end of the stator may be so constructed and located that the finish leads will be engaged therewith and terminated thereto at the winding station. For example, the terminal member may have an outwardly facing tang, in which case the wire may be terminated thereto by motions of winding ram 32 and needles 34, much like the connection of a coil lead wire to a commutator in armature manufacturing. In such cases, the termination tooling assembly 300 can only be used to sever the finish wires adjacent their respective terminal members 16.

The scrap portion of each finish wire is removed and discarded by the conventional industrial robot 250 used to terminate coil leads to terminal members 16 of the proximal end of the stator 14. As mentioned above, it is preferable to grip the scrap portion of a finish wire with the robot 250 before the finish wire is cut so that the scrap wire can be readily discarded. However, it will be noted that, because each of the finish wires is severed at the same time, only one finish wire can be gripped by the robot 250 before severing. The scrap portion of other, ungripped finish wires can thereafter be gripped and discarded by the robot. One skilled in the art will recognize that the scrap portions of each finish wire remain held in a temporary wire clamp 36 during the severing process, which permits the robot 250 to locate and grip the scrap portion for discarding.

The termination of the various coil lead wires at the lead terminating station D can be carried out in any suitable sequence. For example, the finish wires could be terminated while the start wires are being terminated. However, it is preferred to terminate the finish wires to the terminal members 16 on the distal end of the stator 14, as described above, before terminating the start wires on the terminal members 16 on the proximal end of the stator 14. This sequence permits the scrap portions of the finish wires to be discarded before the robot 250 is operated to terminate the start wires, thereby avoiding any possibility that the start leads could become entangled with the scrap portions of the finish wires during the termination process.

Although the presently preferred embodiments of this invention have been described, it will be understood that within the purview of the invention various changes may be made within the scope of the following claims.

Having thus described my invention, I claim:

1. A method for temporarily connecting stator coil lead wires to the distal end of a stator supported in alignment with a winding ram driven by a winding head of a stator winding machine, the ram having at least one wire exit needle that winds coils around stator pole pieces by repeated reciprocal movements of the ram through the stator and reverse oscillatory movements of the ram at opposite ends of the stator, said method comprising the steps of:

winding a coil on the stator core by reciprocatory and oscillatory movements of the ram;

stopping the movements of the ram with the needle adjacent the distal end of the stator;

moving a wire guide adjacent a terminal member on the distal end of the stator;

resuming the movements of the ram to cause the stretch of wire exiting from the needle to engage the wire guide and to be moved thereby into alignment with the terminal member;

continuing the movements of the ram until the needle is retracted through the stator bore while maintaining the alignment of the stretch of wire with the terminal member;

connecting the stretch of wire exiting from the needle to a temporary wire clamp adjacent the proximal end of the stator; and removing the wire guide from adjacent the terminal member before connecting the stretch of wire to the temporary wire clamp.

2. The method of claim 1 wherein the wire guide slides out of engagement with the wire when it is removed from adjacent the terminal member.

3. The method of claim 1 further comprising the steps of:

loading winding forms onto said stator before commencing the winding of a coil;

locking said winding forms to the stator by the movements of a pair of winding form-retaining blades; and moving said wire guide with one of said winding form retaining blades from a retracted position in which it is above a stator to be wound to an extended position in which in which it is located to one side of the terminal member.

4. The method of claim 3 wherein said wire guide is supported by a piston of an air actuator mounted on a frame connected to said one of said winding form-retaining blades and said wire guide is moved laterally of the stator to its position adjacent said terminal member by the extension of said piston upon operation of said air actuator.

5. The method of claim 1 wherein said wire is maintained in alignment with said terminal member by extending said wire past said terminal member before fully retracting said needle through the stator bore.

6. Apparatus for temporarily connecting stator coil lead wires to the distal end of a stator supported in alignment with a winding ram of a stator winding head with its proximal end facing the winding head and its distal end facing away from the winding machine, the ram having at least one wire exit needle that winds coils around stator pole pieces by repeated reciprocal movements of the ram through the stator and reverse oscillatory movements of the ram at opposite ends of the stator, said apparatus comprising:

a wire guide movable laterally of the stator at the winding station;

an air actuator for moving said wire guide to a position adjacent the terminal member at the end of the winding of a coil with the head of the ram at the distal end of the stator, the wire guide being in position to be engaged by the wire and to guide the wire into alignment with the terminal member during movement of the ram.

7. The apparatus of claim 6 wherein said winding machine includes a pair of winding forms and a pair of form locking blades, and said apparatus for connecting the lead wire to the terminal member further includes a guide member-mounting frame mounted on one of said blades and said air actuator is mounted on said mounting frame.

8. A stator winding machine, comprising:

a winding head having a reciprocating and oscillating ram;

a stator support at said winding station;

a pair of winding forms;

a pair of form locking blades; and a wire guide assembly mounted on one of said locking blades comprising an air actuator and a wire guide member movable by operation of said air actuator laterally of a stator being wound from a position remote from the stator into a position adjacent a terminal member on the distal end of the stator.

* * * * *